United States Patent [19]
Ishika

[11] Patent Number: 5,105,411
[45] Date of Patent: Apr. 14, 1992

[54] APPARATUS FOR DETECTING AND CORRECTING FOCUSING AND TRACKING ERRORS

[75] Inventor: Sou Ishika, Kawasaki, Japan

[73] Assignee: Kabushiki Kaisha Toshiba, Kawasaki, Japan

[21] Appl. No.: 441,449

[22] Filed: Nov. 27, 1989

[30] Foreign Application Priority Data

Nov. 30, 1988 [JP] Japan ................. 63-302474

[51] Int. Cl.$^5$ .............................................. G11B 7/00
[52] U.S. Cl. .................... 369/44.41; 369/44.24; 369/44.39; 369/44.23; 369/112
[58] Field of Search ............... 369/44.11, 44.14, 44.24, 369/44.26, 44.39, 112, 121, 124, 44.23, 44.41, 44.42

[56] References Cited

U.S. PATENT DOCUMENTS 4,504,938 3/1985 Tajima .......................... 369/44.11

FOREIGN PATENT DOCUMENTS

56-83848 7/1981 Japan .

*Primary Examiner*—Roy N. Envall, Jr.
*Assistant Examiner*—Nabil Hindi
*Attorney, Agent, or Firm*—Finnegan, Henderson, Farabow, Garrett and Dunner

[57] ABSTRACT

A light beam emitted from a semiconductor laser is converged on a recording surface of an optical disk by a lens. The light beam is intensity-modulated and reflected in accordance with information recorded on the optical disk. The light beam is guided to a photodetector through a light beam diverging unit. The diverging unit is formed of first and second glass plates individually having parallel flat surfaces. A gap is formed between the first and second glass plates such that the glass plates are situated at substantially equal distances from the optical axis. The glass plates are oppositely tilted to the optical axis. The light beam is divided into three light beams by the first and second glass plates, the three light beams including first and second light beams and a third light beam which passes through the gap between the glass plates. The individual light beams separated by the light beam diverging device are guided to the photodetector, which has four detecting regions separated by separation lines. An output from the detecting regions irradiated with the first and second light beams is electrically processed to detect a focusing error, while an output from the detecting region irradiated with the third light beam is electrically processed to detect a tracking error. If a difference is detected between the outputs, in the focusing and tracking operation, correction signals corresponding to individual detection signals are supplied to a shifting device supporting the lens for movement, so that the lens is kept focused.

18 Claims, 7 Drawing Sheets

APPARATUS FOR DETECTING AND CORRECTING FOCUSING AND TRACKING ERRORS

BACKGROUND OF THE INVENTION

1. Field of the Invention

The present invention relates to an apparatus for detecting focusing and tracking errors, which is incorporated in an optical filing apparatus for recording, reading, or retrieving information by means of light beams, and more particularly, to an apparatus for detecting and correcting focusing and tracking errors, in which light beams are converged on an information recording medium, e.g., an optical disk, in order to record information on the optical disk or read the recorded information therefrom.

2. Description of the Related Art

Optical filing apparatuses have been developed recently that which can record image information, such as document data, retrieve the information as required, and reproduce the information as a hard or soft copy, e.g., optical disk apparatuses for recording or reproducing image information. In these optical disk apparatuses, a convergent light beam is applied to a disk-shaped recording medium or optical disk, whereby the information is recorded or reproduced. In recording the information on the optical disk, the light beam is applied to change the state of a region on a recording surface of the disk. As a result, the information is recorded in the form of pits on those tracks of the optical disk with a plurality of concentric grooves thereon. In reproducing the information, a light beam with a constant luminous intensity is applied to the recording surface, and its intensity is modulated by the pits. The intensity-modulated beam is reflected by the recording surface and then is detected by a detecting surface of a photodetector. The light beam detected by the photodetector is processed by means of a signal processing circuit, whereupon the information is reproduced. In recording and reproducing the information, the optical disk is rotated at a constant linear speed. More specifically, the disk is rotated slower when its outer tracks are used for the recording or reproduction, and faster when its inner tracks are used. At the same time, an optical head for directing the light beam to the optical disk is linearly moved in the radial direction, that is, at right angles to the tracks on the disk.

The optical head comprises an objective lens for converging the light beam on the tracks of the optical disk, supporting means for supporting the objective lens for movement in the direction of the optical axis, in order to allow the light beam converged by the lens to be accurately applied to a specific region, and shifting means for moving the lens. Thus, the objective lens is moved in the direction of the optical axis by a movable mechanism, which includes the supporting and shifting means, so that it is kept focused, and also, the light beam from the lens is converged on the tracks of the optical disk. In order to maintain the focused state of the objective lens, at this time, a focusing error on the recording surface is detected, and the detection result is fed back to the movable mechanism for the objective lens. Conventional methods of such focusing error detection include, for example, the wedge prism method.

In the wedge prism method, the light beam reflected by the information recording medium in a focused state is transmitted through a convergent lens, and is divided into two beams by means of a wedge prism. In doing this, the wedge prism gives a specific angle to the two light beams, so that the branch beams are diverged in different directions. These two divergent light beams are applied individually to the respective detecting surfaces of two photodetectors in predetermined positions, and are converted into electric signals. These electric signals are processed to produce a focusing control signal corresponding to a focusing error, and this focusing control signal is supplied to a voice coil for moving the objective lens. As the focusing control signal is supplied to the voice coil in this manner, the objective lens is moved so that the light beam is focused on the information recording medium.

In the focusing control described above, the light beam is divided, by the wedge prism, into two divergent beams which emerge in different directions, at the specific angle to the optical axis. Accordingly, the space between the two photodetectors for detecting the two beams substantially depends on the distances between the prism and the photodetectors in the direction of the optical axis. In order to achieve accurate focusing control, therefore, the space between the photodetectors, which depends on the mounting position of the wedge prism, must be adjusted when the apparatus is assembled.

A measure to counter this problem is proposed in U.S. patent application No. 271,827 (Nov. 16, 1988) by Sou Ishika.

SUMMARY OF THE INVENTION

The object of the present invention is to provide an apparatus for detecting and correcting focusing and tracking errors to effect optimum focusing and tracking on an information recording medium or optical disk.

According to the present invention, there is provided an apparatus for detecting and correcting focusing and tracking errors, which comprises: a light source for emitting a light beam; converging means, having an optical axis, for converging the light beam from the light source on an information recording medium; first and second refractors for guiding the light beam reflected by the information recording medium to a photodetector, the refractors being tilted relative to the optical axis, in opposite directions and facing each other across a gap of a predetermined size through which the optical axis passes; means for detecting the light beam and generating a detection signal, the detecting means being adapted to detect a first light beam diverged by the first refractor, a second light beam diverged by the second refractor, and a third light beam passed through the gap; first response means for adjusting the position of the converging means relative to the information recording medium, in the direction of the optical axis, and responsive to detection signals obtained from the first and second light beams; and second response means for adjusting the position of the converging means relative to the information recording medium, in the direction of a plane perpendicular to the optical axis, and responsive to a detection signal obtained from the third light beam.

DETAILED DESCRIPTION OF THE PREFERRED EMBODIMENTS

An embodiment of the present invention will now be described with reference to the accompanying drawings.

Figure 1:
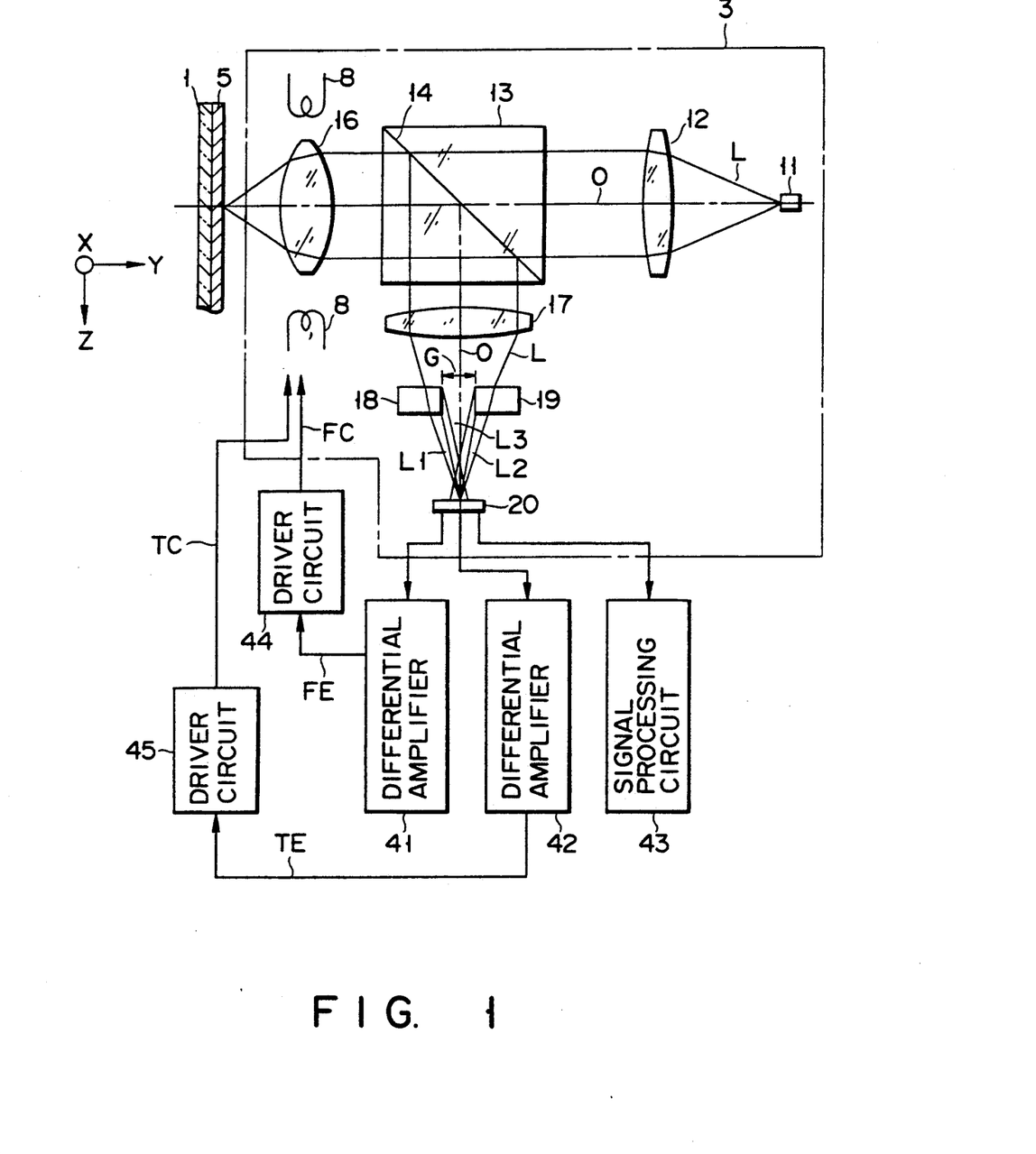
FIG. 1 is a schematic view showing an optical head with an apparatus for detecting and correcting focusing and tracking errors according to an embodiment of the present invention.

FIG. 1 is a schematic view of an optical disk apparatus which incorporates an apparatus for detecting and correcting focusing and tracking errors according to the present invention. A recording medium or optical disk 1 shown in FIG. 1 is a disk-shaped substrate of glass or plastic material having a metal film of tellurium or bismuth, for use as an information recording film, formed thereon by coating or vacuum evaporation. Concentric tracks 5, which define a recording region, are formed on the recording surface of disk 1. In FIG. 1, tracks 5 extend in the Z-axis direction. Optical head 3, which is used to record on or reproduce information from the recording surface of disk 1, is disposed opposite the disk. In recording, reproducing, or retrieving information in the optical disk apparatus, optical disk 1 is rotated at a constant linear speed relative to head 3. More specifically, disk 1 is rotated slower when its outer tracks are used for the recording or reproduction, and faster when its inner tracks are used.

Optical head 3 is provided with semiconductor laser 11 for use as a light source. Diffusible light beam L is emitted from laser 11. When information is written or recorded on the recording surface of optical disk 1, the luminous intensity of light beam L is modulated in response to the information to be written before beam L is radiated. When the information is read or reproduced from the recording surface of disk 1, light beam L is emitted with a constant luminous intensity. The diffusible light beam emitted from semiconductor laser 11 is converted into a parallel luminous flux by means of collimating lens 12, and is then guided to half-prism 13. Thereupon, light beam L passes through prism 13 to be incident on objective lens 16, and is then converged toward the recording surface of optical disk 1.

Objective lens 16 is supported so as to be movable along the optical axis thereof and within a plane perpendicular to the optical axis or parallel to the recording surface. When lens 16 is located in an optimum position or focused position on the optical axis, the waist of convergent light beam L, transmitted through lens 16, is applied to the recording surface of optical disk 1, so that the smallest beam spot is formed on the recording surface. When objective lens 16 is located in an optimum position or on-track position within the plane perpendicular to the optical axis, a beam spot is accurately formed on tracks 5 of disk 1 which define the recording region, and the tracks are traced by means of the light beam. As the focused state and the on-track state are maintained, the information can be written (recorded) or read (reproduced). In recording the information, pits are formed on the recording surface by means of a light beam with a modulated intensity. In reproducing the information, on the other hand, a light beam with a constant intensity (usually, lower than the light beam intensity for the recording mode) is intensity-modulated and reflected by recording information, formed of pits or the like in the tracks.

In the focused state, diffusible light beam L reflected by the recording surface of optical disk 1 passes again through objective lens 16 to be converted thereby into a parallel luminous flux, and is returned to half-prism 13. Thereupon, beam L is reflected by polarizing surface 14 of prism 13, and is transmitted through spherical convex lens 17 for convergence, to be incident on gap G of a predetermined size and first and second light refractors 18 and 19 on either side of gap G. Refractors 18 and 19 are arranged so that the opposite end portions of the light beam except the substantially central portion thereof, with respect to the cross section of the beam, are incident on the refractors. Thus, refractors 18 and 19 serve to divide incident light beam L into first and second light beams L1 and L2 which are parallel to each other. Beams L1 and L2 divided by refractors 18 and 19 are applied to a detecting surface of photodetector 20. Meanwhile, third light beam L3, which passes through gap G between first and second light refractors 18 and 19, corresponding to the substantially central region of the cross section of light beam L, is also applied to the detecting surface of photodetector 20. Light beams L1, L2, and L3, thus applied to photodetector 20, are converted into electric signals and processed in individual light detecting regions. As the electric signals corresponding to light beams L1 and L2 are processed in the manner mentioned later, focusing error signal FE is delivered from driver circuit 44. In response to signal FE, a focusing control signal FC is supplied to voice coil motor 8, so that objective lens 16 is moved in the direction of its optical axis to control the focuses of the light beams. As the electric signal corresponding to light beam L3 is processed in the manner mentioned later, tracking error signal TE is delivered from driver circuit 45. In response to signal TE, a tracking control signal is supplied to motor 8, so that lens 16 is moved within the plane perpendicular to its optical axis, whereby specific tracks are traced by means of the light beam. The signals detected in all the light detecting regions are added by means of signal processing circuit 43, and the resulting signal is used as an information read signal.

Figure 2:
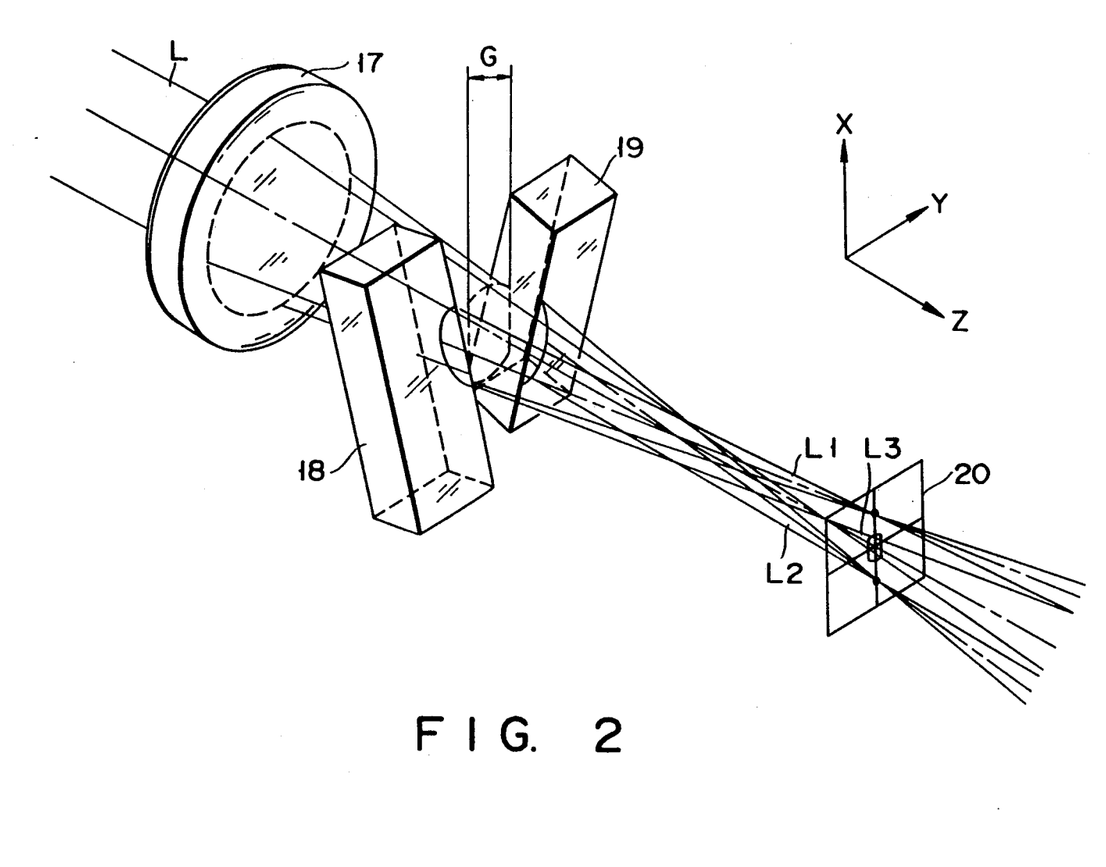
FIG. 2 is a perspective view of a detection optical system of the apparatus shown in FIG. 1.

Referring now to FIG. 2, the functions of first and second light refractors 18 and 19 will be described in detail. Refractors 18 and 19 are each formed of, e.g., a glass plate, and preferably, are substantially parallel flat plates of equal thicknesses. Parallel flat plates 18 and 19 have their respective opposite side faces extending parallel to the X-Z plane at predetermined distance G from each other. Thus, gap G of the predetermined size is provided parallel to the central axis, between the one side face or beam-side face of first plate 18 and that of second plate 19, so that the substantially central portion of the incident light beam is passed through gap G. The size of gap G is determined depending on the size of a light beam with a substantially circular sectional shape emerging from spherical convex lens 17. Preferably, gap G is made just wide enough to allow the passage of a light beam of a size equal to one-third the diameter of the cross section of incident light beam L. Further, the respective incidence and emergence surfaces of first and second parallel flat plates 18 and 19 are inclined at a predetermined angle to the plane perpendicular to the optical axis, and preferably, they are tilted at substantially equal angles to the optical axis in opposite directions. Thus, the incident light beam is divided along an X-direction line perpendicular to the direction (Y-direction) in which a reflection of tracks 5 on the optical disk is projected, as mentioned later. Since the respective incidence and emergence surfaces of first and second plates 18 and 19 are tilted in this manner, the light beam transmitted through plates 18 and 19 are divided into first and second light beams L1 and L2 which are substantially parallel to the optical axis of incident beam L and are kept at predetermined space D from each other. The light beams emerging from first and second flat plates 18 and 19 are converged and applied to the detecting surface of photodetector 20. Furthermore, third light beam L3 passes through gap G which is situated substantially in the center of the cross section of the incident light beam. The third beam is also converged and applied to photodetector 20.

Photodetector 20 is disposed so that the respective convergent points of first and second light beams L1 and L2 are on the detecting surface of the photodetector when objective lens 16 is focused on optical disk 1. Accordingly, third light beam L3, which passes through a gap between parallel flat plates 18 and 19, is converged on a third convergent point between the gap and the first and second convergent points of the first and second light beams, is diverged from the third convergent point and is applied to the detecting surface of photodetector 20. Thus, third beam L3 forms a beam spot larger than a beam waist at its convergent point, on the detecting surface of photodetector 20. The shape of the spot of the light beam on the detecting surface is determined substantially depending on the position of the photodetector, with respect to the direction of the optical axis, the thickness of parallel flat plates 18 and 19, and the size of gap G. Space D between first and second beams L1 and L2 depends on refractive index n of first and second plates 18 and 19 and angle $\theta$ formed between the plates.

Figure 3A:
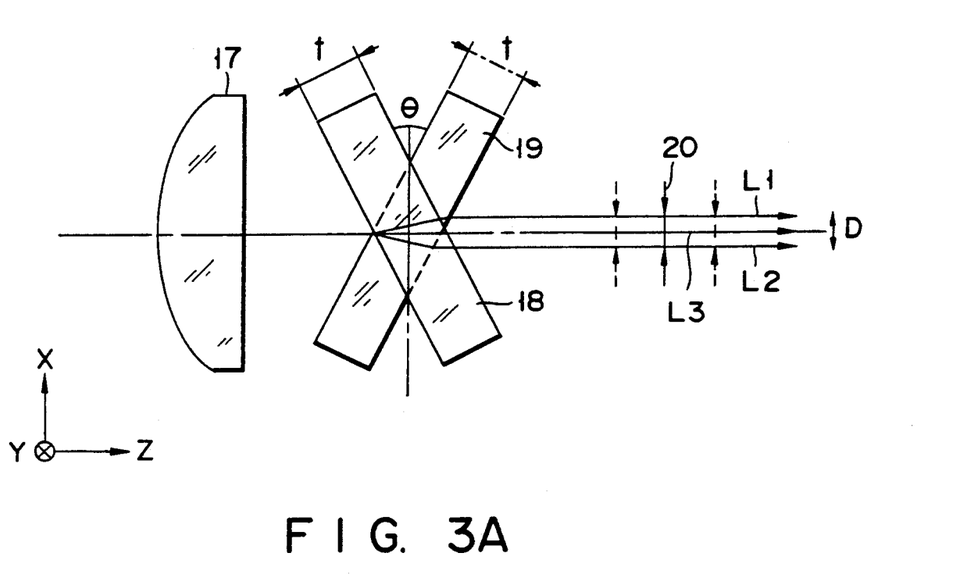
FIGS. 3A and 3B are diagrams for illustrating the optical path of a light beam in the detection optical system shown in, FIG. 2.
Figure 3B:
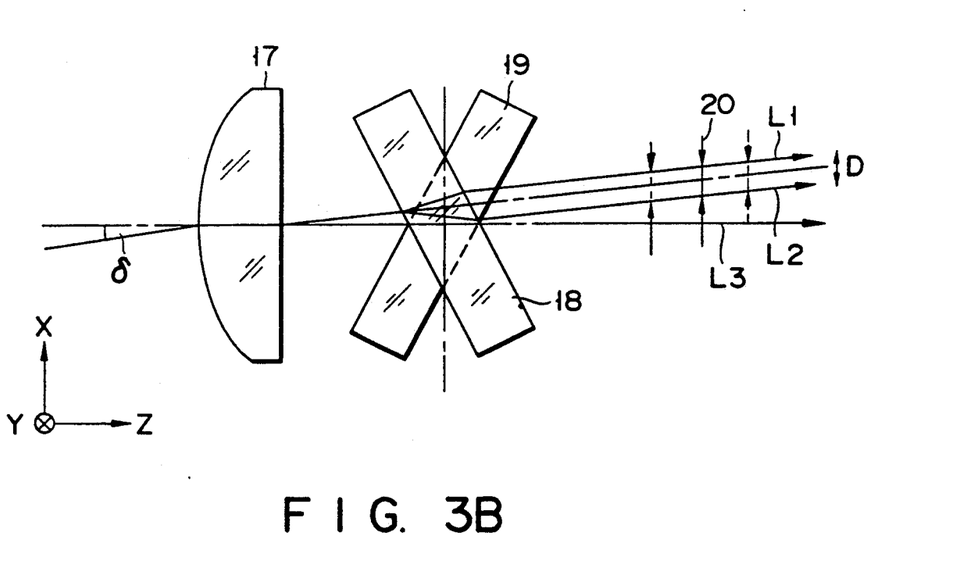

FIG. 3A and 3B are diagrams showing the optical path of the light beam incident on first and second parallel flat plates 18 and 19. In FIG. 3A, incident light beam L from spherical lens 17 is divided into first and second light beams L1 and L2, which are substantially parallel to the axis of beam L, and beams L1 and L2 emerge from first and second plates 18 and 19, respectively. In FIGS. 3A and 3B, parallel flat plates 18 and 19, which are made of the same refractive material, have equal thicknesses. If the thickness and refractive index of plates 18, 19 and the angle between the plates are t, n, and $\theta$, respectively, space D between parallel light beams L1 and L2 in the X-direction can be approximately given by $(1-1/n)\theta t$ as long as angle $\theta$ is relatively narrow. Thus, X-direction space D between the light beams does not depend on the distances between convergent lens 17, parallel flat plates 18 and 19, and photodetector 20.

FIG. 3B shows a deviation of X-direction space D between light beams L1 and L2 which are diverged by parallel flat plates 18 and 19 when the incident light beam is inclined at angle $\delta$ to the optical axis. If the incident light beam is inclined at angle $\delta$ to the optical axis, as shown in FIG. 3B, the deviation of light beam L2 caused by second flat plate 19 is increased by $(1-1/n)\delta t$, while the deviation of light beam L1 caused by first flat plate 18 is decreased by $(1-1/n)\delta t$. Thus, X-direction space $\delta$ between the two light beams does not depend on angle 6 as long as angle between the two glass plates is relatively narrow, as in the case where the incident light beam is in alignment with the optical axis (case of FIG. 3A). In this manner, space D between beams L1 and L2 emerging from parallel flat plates 18 and 19 can be kept substantially constant, without being influenced by the deviation of each optical component in the direction of the optical axis. Thus, there may be provided a focusing control apparatus which can be easily assembled and adjusted.

FIGS. 4A to 4C and 5A to 5C show a first embodiment of the photodetector used in the apparatus for detecting and correcting focusing and tracking errors according to the present invention.

Figure 4A:
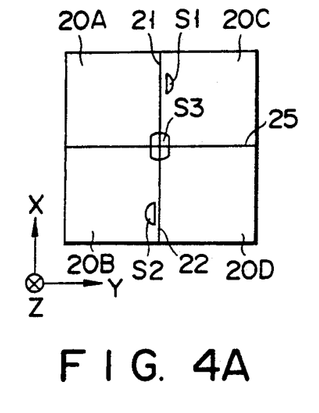
FIGS. 4A, 4B and 4C are diagrams schematically showing beam spot patterns on a photodetector obtained in focused and defocused states of the light beam in the detection optical system of FIG. 2.
Figure 4B:
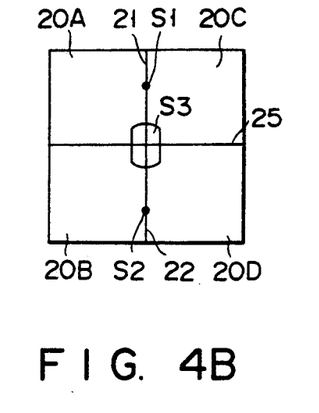
Figure 4C:
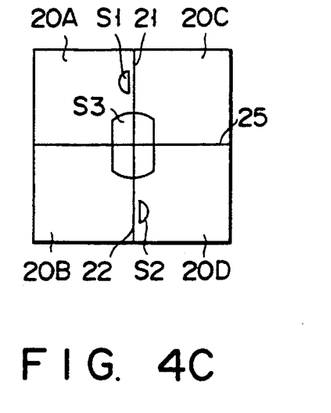

FIGS. 4A to 4C show changes of the shapes of beam spots obtained in focused and defocused states. Photodetector 20 is separated into two substantially equal parts by separation lines 21 and 22 which extend in the X-direction (vertical direction), and each half is further separated in two by separation line 25 which extends in the Y-direction (horizontal direction). Thus, the photodetector includes four photo sensitive regions 20A, 20B, 20C and 20D. Line 25 is previously set so as to extend parallel to the direction (Y-direction) in which the refection of tracks 5, diffracted and projected from the optical disk, extends.

First light beam L1, passing through first flat plate 18, is applied to a first group of light detecting regions 20A and 20C which are separated from a second group of regions 20B and 20D, respectively, by separation line 25. On the other hand, second light beam L2, passing through second flat plate 19, is applied to the second group of regions 20B and 20D. Third light beam L3, which passes through gap G, is applied to all of detecting regions 20A, 20B, 20C and 20D.

When objective lens 16 is focused on optical disk 1, beam spots, such as the ones shown in FIG. 4B, are formed on photodetector 20. More specifically, circular first beam spot S1 with a fine area is formed centering on separation line 21, which separates detecting regions 20A and 20C, by means of first light beam L1 transmitted through first flat plate 18. At the same time, circular second beam spot S2 with a fine area is formed centering on separation line 22, which separates detecting regions 20B and 20D, by means of second light beam L2 transmitted through second flat plate 19. Thus, if the outputs of detecting regions 20A, 20B, 20C and 20D are (1), (2), (3) and (4), respectively, the respective positions of separation lines 21 and 22 are previously adjusted so that the focusing error signal (FE) is equal to 0 in the focused state, that is, $FE = [\{(1)+(4)\}-\{(2)+(3)\}] = 0$ is fulfilled. At the same time, the respective positions of lines 21 and 22 are previously adjusted so that the sum of the luminous intensities detected in detecting regions 20A and 20C to be irradiated with third beam L3 is always equal to the sum of the luminous intensities detected in detecting regions 20B and 20D, that is, $[\{(1)+(4)\}-\{(2)+(3)\}] = 0$ is fulfilled.

Focusing and tracking deviations can be detected by thus adjusting the size of the light beam spots in the focused state and using the photodetector arranged in this manner.

If objective lens 16 is situated farther from optical disk 1 than in the focused position, the light beam reflected by the disk is weakly converged. Accordingly, the convergent points of the first, second, and third light beams are shifted from the convergent point which is formed in the focused state, to positions between the photodetector 20 and the plates so that an image, such as the one shown in FIG. 4C, is projected on the detecting surface of photodetector 20. More specifically, substantially semicircular beam spot S1 is formed on light detecting region 20A of photodetector 20, while substantially semicircular beam spot S2 oriented opposite to spot S1 is formed on light detecting region 20D. At the same time, beam spot S3 of a greater size than in the focused state is formed on those parts of detecting regions 20A to 20D in the central portion of photodetector 20. In this case, the focusing error signal (FE) is $FE > 0$.

If objective lens 16 brought closer to optical disk 1 than in the focused position, on the other hand, the light beam reflected by the disk is more converged than in the focused state. Accordingly, the convergent points of the first, second, and third light beams are shifted to positions beyond those in the focused state, so that an image, such as the one shown in FIG. 4A, is projected on photodetector 20. More specifically, substantially semicircular beam spot S1 is formed on light detecting region 20C of photodetector 20, while substantially semicircular beam spot S2 oriented opposite to spot S1 is formed on light detecting region 20B. At the same time, beam spot S3 of a smaller size than in the focused state is formed on detecting regions 20A to 20D of photodetector 20. In this case, the focusing error signal (FE) is $FE < 0$.

The shapes and sizes of beam spots S1, S2 and S3 applied to photodetector 20 of the present invention vary depending on the size of gap G. Accordingly, the position of objective lens 16 relative to optical disk 1, with respect to the direction of the optical axis, is adjusted by feeding back a difference signal, indicative of the difference between electric signals generated from light detecting regions 20A and 20B and from regions 20C and 20D, to a driver circuit for lens 16, the difference signal varying as lens 16 is moved in the direction of the optical axis. In either of the focused and defocused states mentioned before, moreover, the shapes of the beam spots on detecting regions 20A and 20C are identical with those of the beam spots on regions 20B and 20D.

In reading the information recorded on optical disk 1, the aforementioned focused state must be maintained, and the light beam must be applied to the region where the information to be read is recorded, that is, specific guide groove (track) 5. To attain this, it is necessary to provide control means (tracking guide) for continually keeping the light beam on the specific track.

Figure 5A:
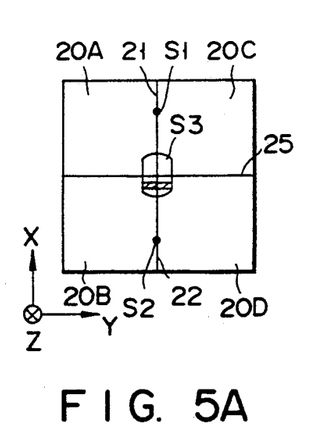
FIGS. 5A, 5B and 5C are diagrams schematically showing beam spot patterns on the photodetector obtained in on- and off-track states of the light beam in the detection optical system of FIG. 2.
Figure 5B:
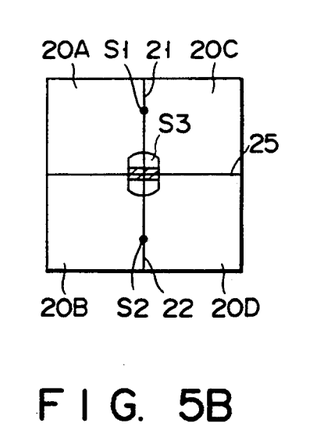
Figure 5C:
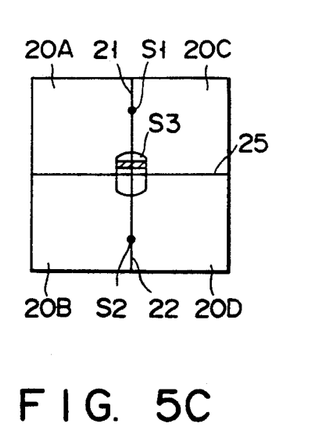

FIGS. 5A to 5C show changes of beam spots on the detecting surface of the photodetector obtained in on- and off-track states.

A belt-shaped dark region (shadow of the track) is used as the tracking guide which is formed when the light beam applied to optical disk is diffracted by track 5 and projected on the photodetector. As shown in FIGS. 5A to 5C, the shadow of the track extends parallel to separation line 25 which separates light detecting regions 20A and 20C from regions 20B and 20D. In the on-track state, a beam spot, such as the one shown in FIG. 5B, is formed on the detecting surface. In this case, the dark region is projected symmetrically with respect to separation line 25. Thus, the position in which the shadow of the track is projected symmetrically with respect to line 25 is defined as the on-track position, and the deviation of the track position is detected by determining the deflection from the on-track position. More specifically, the position of objective lens 16 is adjusted on a plane parallel to the optical disk so that the tracking error signal (TE) is $TE = \{[(5)-(6)]\} = 0$, where (5) and (6) are output signals from the combination of light detecting regions 20A and 20C and the combination of regions 20B and 20D, respectively. In other words, lens 16 is positioned so that a detected difference signal or track deviation signal, which is indicative of the difference between detection signals from the combination of regions 20A and 20C and the combination of regions 20B and 20D, is a zero signal.

Figure 6:
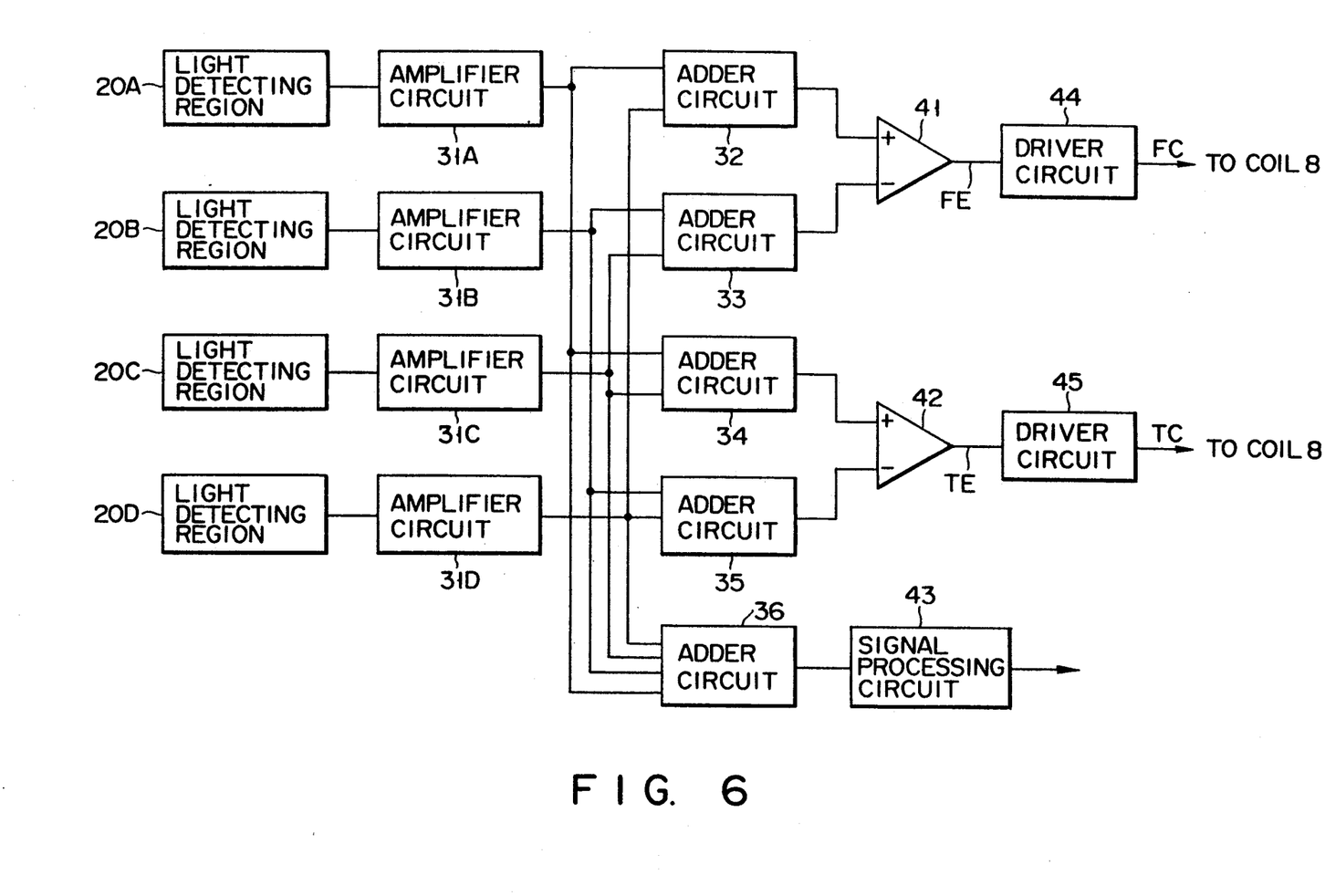
FIG. 6 is a block diagram showing the details of an electric circuit according to the embodiment shown in FIG. 1.

Referring now to FIG. 6, a processing circuit for all the electric signals detected by means of photodetector 20 will be described.

The outputs of light detecting regions 20A, 20B, 20C and 20D are supplied to amplifier circuits 31A, 31B, 31C and 31D, respectively. The signals from amplifier circuits 31A, 31B, 31C and 31D are supplied to adder circuits 32 and 34; 33 and 35; 33 and 34; and 32 and 35 respectively.

The respective outputs of adder circuits 32 and 33 are utilized for supplying focusing control signal FC to the voice coil. More specifically, the outputs of circuits 32 and 33 are supplied to the inverted and noninverted input terminals, respectively, of differential amplifier 41. In amplifier 41, the sum of detection signals from light detecting regions 20A and 20D is compared with the sum of detection signals from detecting regions 20B and 20C, and an output or focusing error signal FE, corresponding to a signal indicative of the difference between the two sums, is supplied to driver circuit 44. In response to signal FE fed to circuit 44, a current is fed back to the coil (not shown) for driving objective lens 16 in the direction of the optical axis thereof. Lens 16 is driven in accordance with the feedback current or focusing control signal FC, so that a focusing error is corrected.

In other hand, the respective outputs of adder circuits 32 and 33 are utilized for supplying tracking control signal TC to the voice coil. More specifically, the outputs of circuits 34 and 35 are supplied to the inverted and noninverted input terminals, respectively, of differential amplifier 42. In amplifier 42, the sum of detection outputs from light detecting regions 20A and 20C is compared with the sum of detection outputs from detecting regions 20B and 20D, and an output or tracking error signal TE, corresponding to a signal indicative of the difference between the two sums, is supplied to driver circuit 45. In response to signal TE fed to circuit 45, a current is fed back to the coil (not shown) for driving objective lens 16 within the plane perpendicular to the optical axis thereof. Lens 16 is driven in accordance with the feedback current or tracking control signal TC, so that a tracking error is corrected.

Furthermore, the output of adder circuit 36, that is, all the output signals from light detecting regions 20A to 20D, are processed in signal processing circuit 43 and utilized for the reproduction of the information.

Focusing and tracking deviations can be detected by thus adjusting the size of the light beam spots in the focused state and using the photodetector arranged in this manner.

In the embodiment described herein, first and second light beams L1 and L2 are used as servo signal (FC) for the focusing control, while light beam L3 is used as a servo signal (TC) for the tracking guide.

In the focusing control apparatus described above, divergence light beam L emitted from semiconductor laser 11 is converted into a parallel luminous flux by means of collimating lens 12, and is then guided to half-prism 13. Thereupon, light beam L passes through prism 13 to be incident on objective lens 16, and is converged toward the recording surface of optical disk 1 by lens 16. In recording the information on optical disk 1, a light beam (recording beam) with a high modulated luminous intensity is applied to the disk, whereupon pits are formed on tracks 5 of the disk. In reproducing the information from optical disk 1, a light beam (playback beam) with a low constant luminous intensity is applied to the disk, and is intensity-modulated and reflected by the pits. A reflected light beam from optical disk 1, obtained from the playback beam, is guided again to objective lens 16 to be converged thereby into a parallel luminous flux, and is returned to half-prism 13. Thereupon, beam L is reflected by polarizing surface 14 of prism 13, and is guided to spherical convex lens 17. Part of the light beam guided to lens 17, that is, substantially central portion L3 of the section of the beam, passes through gap G between first and second parallel flat plates 18 and 19, to be applied to the central portion of photodetector 20. The light beam incident on first and second refractors 18 and 19 are divided into first and second light beams L1 and L2 substantially parallel to each other, and beams L1 and L2 are applied to photodetector 20. Signals generated in accordance with light beams L1, L2 and L3 applied to photodetector 20 ar delivered from detecting regions 20A to 20D, to be supplied to amplifier circuits 31A to 31D, individually.

The following is a description of focusing operation performed in this state. Signals from amplifier circuits 31A and 31D are supplied to adder circuit 32, while signals from amplifier circuits 31B and 31C are supplied to adder circuit 33. The detection signals from amplifier circuits 31A and 31D are added in adder circuit 32 and supplied to differential amplifier 41. The detection signals from amplifier circuits 31B and 31C are added in adder circuit 33 and supplied to amplifier 41. Thus, in differential amplifier 41, the sum of the detection signals from light detecting regions 20A and 20D is compared with the sum of the detection signals from detecting regions 20B and 20C, and the difference signal or focusing error signal FE, indicative of the difference between the sums, is supplied to driver circuit 44. The current is supplied to the coil (not shown) in accordance with focusing control signal FC supplied to circuit 44. In response to the current supplied in this manner, objective lens 16 is driven in the direction of the optical axis, whereby the focusing of the light beam is controlled.

The following is a description of tracking operation performed in this state. Signals from amplifier circuits 31A and 31C are supplied to adder circuit 34, while signals from amplifier circuits 31B and 31D are supplied to adder circuit 35. The detection signals from amplifier circuits 31A and 31C are added in adder circuit 34 and supplied to differential amplifier 42. The detection signals from amplifier circuits 31B and 31D are added in adder circuit 35 and supplied to amplifier 42. Thus, in differential amplifier 42, the sum of the detection signals from detecting regions 20A and 20C is compared with the sum of the detection signals from detecting regions 20B and 20D, and the output or tracking error signal TE, indicative of the difference between the sums, is fed back to driver circuit 45. The current or tracking control signal TC is supplied from circuit 45 to the coil (not shown) in accordance with tracking error signal TE. In response to signal TC supplied in this manner, objective lens 16 is driven within the plane perpendicular to the optical axis, whereby the tracking of the light beam is controlled.

The following is a description of reproduction of the information recorded on optical disk 1. In reproducing the information, light beam L with a low fixed luminous intensity is emitted from semiconductor laser 11, and is applied to the pits of tracks 5 of disk 1. Beam L is intensity-modulated and reflected as a play-back beam by the pits, and falls on photodetector 20. The outputs of light detecting regions 20A, 20B, 20C and 20D of the photodetector ar supplied to amplifier circuits 31A, 31B, 31C and 31D, respectively. The respective outputs of circuits 31A to 31D are applied to signal processing circuit 43 and added therein, whereby data recorded on optical disk 1 is reproduced.

In the first embodiment of the present invention described above, the focusing control, tracking control, and signal detection are effected by means of one and the same photodetector which is divided in four. It is to be understood, however, that the photodetector of the invention is not limited to such arrangement, and may, for example, be composed of six divisions so that a detector for focusing is formed separately from a detector for tracking.

Figure 7A:
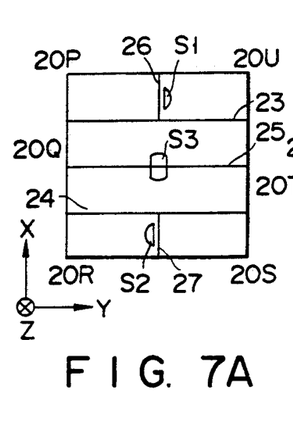
FIGS. 7A, 7B and 7C are diagrams schematically showing patterns on a detecting surface of a photodetector obtained in focused and defocused states of a light beam according to another embodiment of the present invention, applied to the optical system shown in FIG. 2.
Figure 7B:
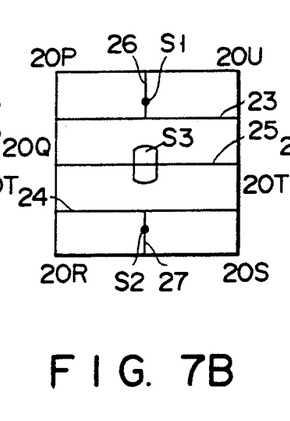
Figure 7C:
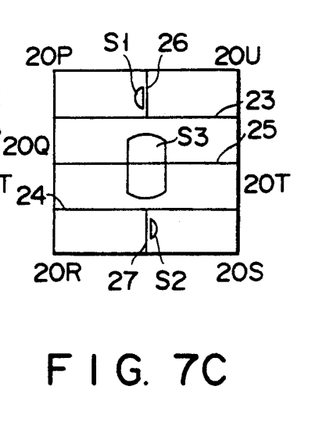

FIGS. 7A to 7C and 8A to 8C show a second embodiment of the photodetector used in the focusing control apparatus according to the present invention. The shapes of beam spots shown in FIGS. 7A to 7C are the same as those of the beam spots applied to photodetector 20 of the first embodiment. The second embodiment differs from the first embodiment only in the detection method and signal processing method.

FIGS. 7A to 7C show changes of the sizes of beam spots obtained in focused and defocused states. In this second embodiment, like reference numerals are used to designate those portions having the same functions as their counterparts of the photodetector of the first embodiment. Photodetector 20 is separated into four substantially equal parts by separation lines 23, 24 and 25 which extend in the Y-direction (horizontal direction), and the top and bottom detecting regions, out of the four horizontally extending belt-shaped regions separated in this manner, are each separated in two by separation lines 26 and 27, respectively. Line 25 is previously set so as to extend parallel to the direction (Y-direction) in which the reflection of tracks 5, diffracted and projected from the optical disk, extends.

First light beam L1, passing through first flat plate 18, is applied to a first group of light detecting regions 20P and 20U which are separated from each other by separation line 26. On the other hand, second light beam L2, passing through second flat plate 19, is applied to a second group of light detecting regions 20R and 20S which are separated from each other by separation line 27. Third light beam L3, which passes through gap G, is applied to light detecting regions 20Q and 20T in the central portion of photodetector 20. Signals detected in detecting regions 20P, 20R, 20S and 20U are used as servo signals for focusing correction, while signals detected in detecting regions 20Q and 20T are used as servo signals for tracking correction. All the signals detected in detecting regions 20P to 20U are used as information reproducing signals.

When objective lens 16 is focused on optical disk 1, beam spots, such as the ones shown in FIG. 7B, are formed on photodetector 20. More specifically, circular first beam spot S1 with a fine area is formed centering on separation line 26, which separates detecting regions 20P and 20U, by means of first light beam L1 transmitted through first flat plate 18. At the same time, circular second beam spot S2 with a fine area is formed centering on separation line 27, which separates detecting regions 20R and 20S, by means of second light beam L2 transmitted through second flat plate 19. Thus, if the outputs of detecting regions 20P, 20Q, 20R, 20S, 20T and 20U are (1), (2), (3), (4), (5) and (6), respectively, the respective positions of separation lines 26 and 27 are previously adjusted so that the focusing error signal (FE) is equal to 0 in the focused state, that is, $FE = [\{(1)+(4)\} - \{(3)+(6)\}] = 0$ is fulfilled. At the same time, the position of separation line 25 between detecting regions 20Q and 20T to be irradiated with third beam L3 is previously adjusted so that of the luminous intensity of the light beam applied to detecting region 20Q is always equal to the luminous intensity of the light beam applied to detecting region 20T, that is, $\{(2)-(5)\} = 0$ is fulfilled.

Focusing and tracking deviations can be detected by thus adjusting the size of the light beam spots in the focused state and using the photodetector arranged in this manner.

If objective lens 16 is situated farther from optical disk 1 than in the focused position, the light beam reflected by the disk is weakly converged. Accordingly, the convergent points of the first, second, and third light beams are shifted from the convergent point which is formed in the focused state, to positions between the photodetector 20 and the plates so that an image, such as the one shown in FIG. 7C, is projected on photodetector 20. More specifically, substantially semicircular beam spot S1 is formed on light detecting region 20P of photodetector 20, while substantially semicircular beam spot S2 oriented opposite to spot S1 is formed on light detecting region 20S. At the same time, beam spot S3 of a greater size than in the focused state is formed on those parts of detecting regions 20Q and 20T in the central portion of photodetector 20. In this case, the focusing error signal (FE) is FE>0.

If objective lens 16 brought closer to optical disk 1 than in the focused position, on the other hand, the light beam reflected by the disk is more converged than in the focused state. Accordingly, the convergent points of the first, second, and third light beams are shifted to positions beyond those in the focused state, so that an image, such as the one shown in FIG. 7A, is projected on photodetector 20. More specifically, substantially semicircular beam spot S1 is formed on light detecting region 20U of photodetector 20, while substantially semicircular beam spot S2 oriented opposite to spot S1 is formed on light detecting region 20R. At the same time, beam spot S3 of a smaller size than in the focused state is formed on detecting regions 20Q and 20T in the central portion of photodetector 20. In this case, the focusing error signal (FE) is FE<0.

The shapes and sizes of beam spots S1, S2 and S3 applied to photodetector 20 of the present invention vary depending on the size of gap G formed between first and second parallel flat plates 18 and 19. Accordingly, the position of objective lens 16 relative to optical disk 1, with respect to the direction of the optical axis, is adjusted by feeding back a difference signal, indicative of the difference between electric signals generated from light detecting regions 20P and 20S and from regions 20U and 20R, to a driver circuit for lens 16, the difference signal varying as lens 16 is moved in the direction of the optical axis. In either of the focused and defocused states mentioned before, moreover, the shape of the beam spot on detecting region 20Q is identical with that of the beam spot on region 20T.

In reading the information recorded on optical disk 1, the aforementioned focused state must be maintained, and the light beam must be applied to the region where the information to be read is recorded, that is, specific guide groove (track) 5. To attain this, it is necessary to provide control means (tracking guide) for continually keeping the light beam on the specific track.

Figure 8A:
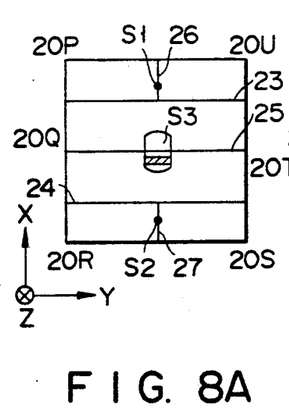
FIGS. 8A, 8B and 8C are diagrams schematically showing patterns on the detecting surface of the photodetector obtained in on- and off-track states.
Figure 8B:
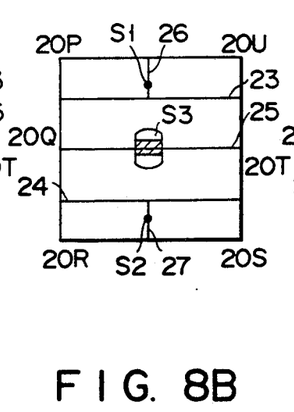
Figure 8C:
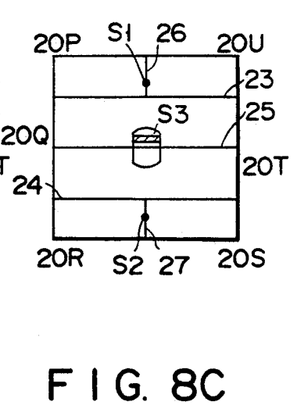

FIGS. 8A to 8C show changes of beam spots on the detecting surface of the photodetector obtained in on- and off-track states.

A belt-shaped dark region (shadow of the track) is used as the tracking guide which is formed when the light beam applied to optical disk 1 is diffracted by track 5 and projected on the photodetector. As shown in FIGS. 8A to 8C, the shadow of the track extends parallel to separation line 25 which separates light detecting regions 20Q and 20T. In the on-track state, a beam spot, such as the one shown in FIG. 8B, is formed on the detecting surface. In this case, the drak region is projected symmetrically with respect to separation line 25. Thus, the position in which the shadow of the track is projected symmetrically with respect to line 25 is defined as the on-track position, and the deviation of the track position is detected by determining the deflection from the on-focus position. More specifically, the position of objective lens 16 is adjusted on a plane parallel to the optical disk so that the tracking error signal (TE) is $TE = \{(5)-(2)\} = 0$, where (2) and (5) are output signals from light detecting regions 20Q and 20T, respectively. In other words, lens 16 is positioned so that a detected difference signal or track deviation signal, which is indicative of the difference between detection signals from regions 20Q and 20T, is a zero signal.

Figure 9:
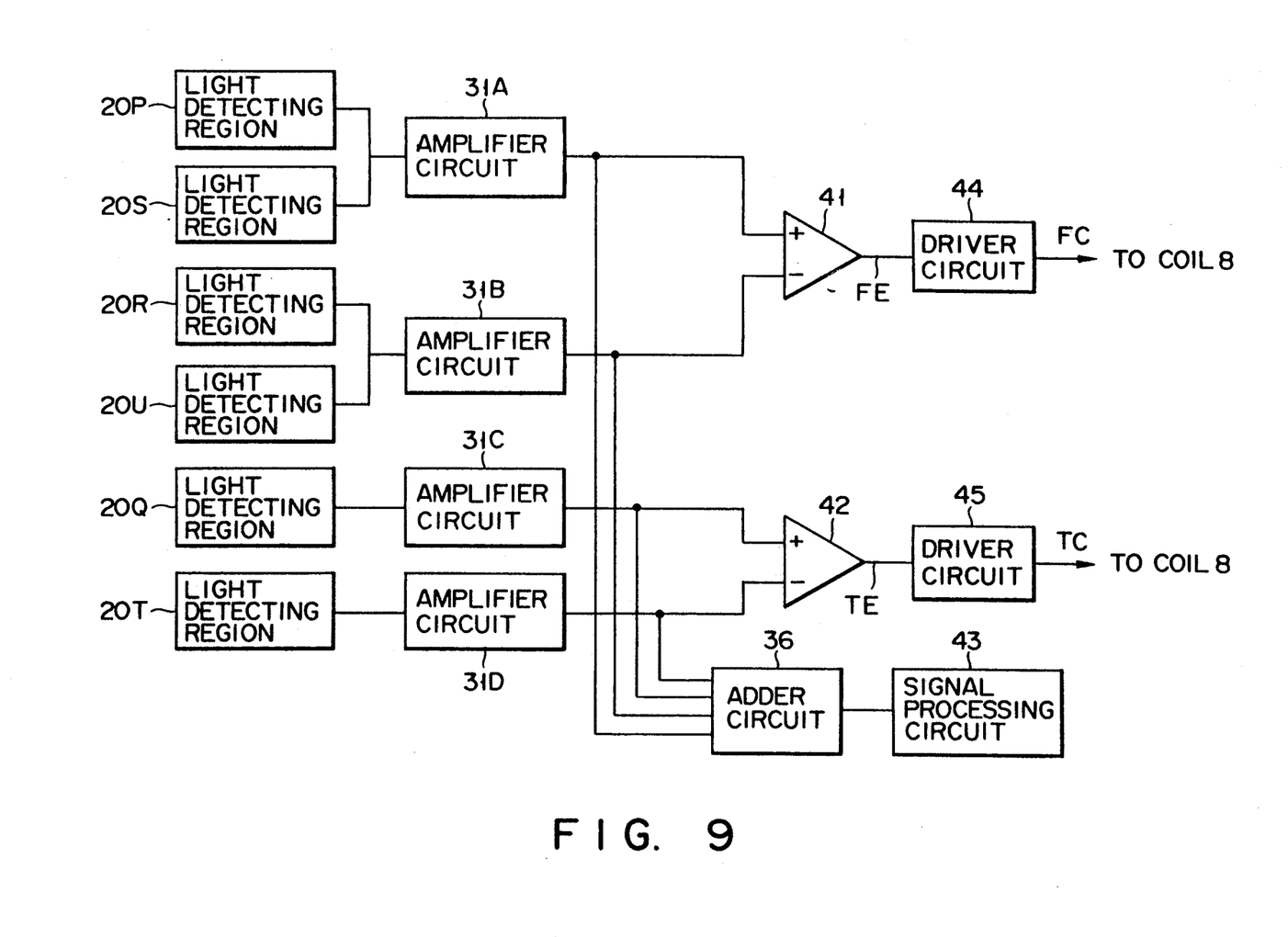
FIG. 9 is a block diagram showing an electric circuit for processing signals detected by the photodetector shown in FIGS. 7A to 8C.

Referring now to FIG. 9, a processing circuit for all the electric signals detected by means of photodetector 20 will be described. The respective outputs of light detecting regions 20P and 20S are supplied to amplifier circuit 31A, while the respective outputs of regions 20R and 20U are supplied to amplifier circuit 31B. Further, the respective outputs of detecting regions 20Q and 20T are supplied to amplifier circuits 31C and 31D, respectively.

The respective outputs of amplifier circuits 31A and 31B are utilized for supplying a focusing control signal to the voice coil. More specifically, the outputs of circuits 31A and 31B are supplied to the inverted and noninverted input terminals, respectively, of differential amplifier 41. In amplifier 41, the sum of detection signals from light detecting regions 20P and 20S is compared with the sum of detection signals from detecting regions 20R and 20U, and an output or focusing error signal, corresponding to a signal indicative of the difference between the two sums, is supplied to driver circuit 44. In response to the signal fed to circuit 44, a current or focusing control signal FC is fed back to the coil (not shown) for driving objective lens 16 in the direction of the optical axis thereof. Lens 16 is driven in accordance with the feedback current, so that a focusing error is corrected.

In other hand, the respective outputs of amplifier circuits 31C and 31D are utilized for supplying a tracking control signal to the voice coil. More specifically, the outputs of circuits 31C and 31D are supplied to the inverted and noninverted input terminals, respectively, of differential amplifier 42. In amplifier 42, detection outputs from light detecting regions 20Q and 20T are compared, and an output or tracking error signal TE, corresponding to a signal indicative of the difference between the two detection outputs, is supplied to driver circuit 45. In response to signal TE fed to circuit 45, a current or tracking control signal TC is fed back to the coil (not shown) for driving objective lens 16 within the plane perpendicular to the optical axis thereof. Thus, lens 16 is driven to correct a tracking error.

Moreover, the signals fed to amplifier circuits 31A to 31D are amplified and supplied to adder circuit 36. The signals added in circuit 36, that is, all the output signals from light detecting regions 20P to 20U, are supplied to a control circuit (not shown) and used as information reproducing signals.

In this second embodiment, the photodetector is provided for each of first and second light beams L and L2, in order to improve the detecting sensitivity for the focusing error signal. Alternatively, however, only one of beams L1 and L2 may be detected.

Furthermore, the arrangement of the photodetector relative to the location of the individual parallel flat plates may be changed. In the first and second embodiments of the present invention, for example, the gap of the predetermined size is formed between the two parallel flat plates, and the respective incidence surfaces of the plates are tilted at equal angles to the optical axis of the incident light beam in opposite directions. Alternatively, however, the two parallel flat plates may be tilted at different angles to the optical axis of the incident light beam in opposite directions. In this case, the detection can be effected with the same result by previously settling the location of the photodetector and the positions of separation lines 21 to 25 thereon.

What is claimed is:

1. An apparatus for detecting and correcting focusing and tracking errors, comprising:

a light source for emitting a light beam;

converging means, having an optical axis, for converging the light beam from the light source on an information recording medium;

first and second means for guiding a light beam reflected by the information recording medium, each of said first and second means being inclined in different directions relative to the optical axis and positioned on opposing sides of a gap of a predetermined size, the optical axis passing through the gap;

means for detecting the guided light beam and generating detection signals, said detecting means detecting a first light beam guided by the first means, a second light beam guided by the second means, and a third light beam passed through the gap;

first response means for adjusting the position of the converging means relative to the information recording medium, in the direction of the optical axis, in response to detection signals obtained from the first and second light beams; and second response means for adjusting the position of the converging means relative to the information recording medium, in the direction of a plane extending perpendicular to the optical axis, in response to a detection signal obtained from the third light beam.

2. The apparatus according to claim 1, wherein said first and second means for guiding the reflected light beam include means for diverging the first and second light beams along substantially parallel paths.

3. The apparatus according to claim 1, wherein said first and second means for guiding the reflected light beam include means for diverging the first and second light beams along substantially parallel paths even though the reflected light beam propagates at an angle to the optical axis.

4. The apparatus according to claim 1, wherein said first and second guiding means are first and second refractors, respectively.

5. The apparatus according to claim 4, wherein said first and second refractors are glass plates, each having flat surfaces parallel to each other.

6. The apparatus according to claim 4, wherein said first and second refractors are formed of the same material.

7. The apparatus according to claim 4, wherein said first and second refractors are situated at substantially equal distances from the optical axis.

8. The apparatus according to claim 1, wherein said detecting means for detecting the first, second and third light beams is a photodetector having a plurality of detecting regions separated by separation lines.

9. The apparatus according to claim 8, wherein said separation lines of said photodetector include lines extending perpendicular and parallel to a track defining a recording region of the information recording medium.

10. The apparatus according to claim 1, wherein the detecting means includes first, second, third, and fourth detecting regions, said first light beam being detected by the first and third detecting regions, said second light beam being detected by the second and fourth detecting regions, and resulting detection signals are processed so that a control signal for adjusting at least the position of the converging means relative to the information recording medium, in the direction of the optical axis, is supplied to the first response means.

11. The apparatus according to claim 10, further comprising means for comparing an output detected by the first and third detecting regions with an output detected by the second and fourth detecting regions and means for supplying the control signal for adjusting at least the position of the converging means relative to the information recording medium, in the direction of the optical axis, to the first response means.

12. The apparatus according to claim 1, wherein the detecting means includes first, second, third, and fourth detecting regions, one half of said third light beam being detected by the first and third detecting regions, the other half of said third light beam being detected by the second and fourth detecting regions, and means for comparing an output detected by the first and third detecting regions with an output detected by the second and fourth detecting regions to generate a control signal for adjusting at least the position of the converging means relative to the information recording medium, in the direction of a plane extending perpendicular to the optical axis, and means for supplying the control signal to the second response means.

13. The apparatus according to claim 4, wherein said refractors are inclined at substantially equal angles to the optical axis.

14. An apparatus for detecting and correcting focusing and tracking errors, comprising:
   a light source for emitting a light beam;
   converging means, having an optical axis, for converging the light beam from the light source on an information recording medium;
   first and second means for guiding a light beam reflected by the information recording medium, each of said first and second means being inclined in different directions relative to the optical axis and positioned on opposing sides of a gap of a predetermined size, the optical axis passing through the gap;
   means for detecting the guided light beam and generating detection signals, said detecting means detecting a first light beam guided by the first means, a second light beam guided by the second means, and a third light beam passed through the gap;
   first response means for adjusting the position of the converging means relative to the information recording medium, in the direction of the optical axis, in response to detection signals obtained from the first and second light beams; and
   second response means for adjusting the position of the converging means relative to the information recording medium, in the direction of a plane extending perpendicular to the optical axis, in response to a detection signal obtained from the third light beam,
   wherein one half of said third light beam is detected by first and third detecting regions, the other half of said third light beam is detected by second and fourth detecting regions, and further including means for processing resulting detection signals so that a control signal for adjusting at least the tracking of the information recording medium is supplied to the second response means.

15. An apparatus for detecting and correcting focusing and tracking errors, comprising:
   a light source for emitting a light beam;
   converging means, having an optical axis, for converging the light beam from the light source on an information recording medium;
   first and second means for guiding a light beam reflected by the information recording medium, each of said first and second means being inclined in different directions relative to the optical axis and positioned on opposing sides of a gap of a predetermined size, the optical axis passing through the gap, wherein said first and second guiding means are first and second refractors, respectively, and said first and second refractors are positioned at substantially equal distances from the optical axis and are positioned a distance apart from one another approximately equal to one-third of the diameter of a section of a beam waist of a converged light beam;
   means for detecting the guided light beam and generating detection signals, said detecting means detecting a first light beam guided by the first means, a second light beam guided by the second means, and a third light beam passed through the gap;
   first response means for adjusting the position of the converging means relative to the information recording medium, in the direction of the optical axis, in response to detection signals obtained from the first and second light beams; and
   second response means for adjusting the position of the converging means relative to the information recording medium, in the direction of a plane extending perpendicular to the optical axis, in response to a detection signal obtained from the third light beam.

16. An apparatus for detecting and correcting focusing and tracking errors, comprising:
   a light source for emitting a light beam;
   converging means, having an optical axis, for converging the light beam from the light source on an information recording medium;
   first and second means for guiding a light beam reflected by the information recording medium, each of said first and second means being inclined in different directions relative to the optical axis and positioned on opposing sides of a gap of a predetermined size, the optical axis passing through the gap;
   means for detecting the guided light beam and generating detection signals, said detecting means detecting a first light beam guided by the first means, a second light beam guided by the second means, and a third light beam passed through the gap, wherein said detecting means for detecting the first, second, and third light beams is a photodetector having first, second, third, and fourth detecting regions separated by separation lines;
   first response means for adjusting the position of the converging means relative to the information recording medium, in the direction of the optical axis, in response to detection signals obtained from the first and second light beams; and
   second response means for adjusting the position of the converging means relative to the information recording medium, in the direction of a plane extending perpendicular to the optical axis, in response to a detection signal obtained from the third light beam.

17. An apparatus for detecting and correcting focusing and tracking errors, comprising:
   a light source for emitting a light beam;
   converging means, having an optical axis, for converging the light beam from the light source on an information recording medium;
   first and second means for guiding a light beam reflected by the information recording medium, each of said first and second means being inclined in different directions relative to the optical axis and positioned on opposing sides of a gap of a predetermined size, the optical axis passing through the gap, wherein said first and second guiding means are first and second refractors, respectively, situated at substantially equal distances from the optical axis and said first and second refractors are glass plates each having flat surfaces parallel to each other;

means for detecting the guided light beam and generating detection signals, said detecting means detecting a first light beam guided by the first means, a second light beam guided by the second means, and a third light beam passed through the gap, wherein said first and second light beams are diverged substantially parallel to each other even though the light beam is incident at an angle to the optical axis;

first response means for adjusting the position of the converging means relative to the information recording medium, in the direction of the optical axis, in response to detection signals obtained from the first and second light beams; and second response means for adjusting the position of the converging means relative to the information recording medium, in the direction of a plane extending perpendicular to the optical axis, in response to a detection signal obtained from the third light beam, wherein said first light beam is detected by first and third detecting regions, said second light beam is detected by second and fourth detecting regions, and resulting detection signals are processed by comparing an output detected by the first and third detecting regions with an output detected by the second and fourth detecting regions, so that a control signal for adjusting at least the position of the converging means relative to the information recording medium, in the direction of the optical axis, is supplied to the first response means, wherein one half of said third light beam is detected by the first and third detecting regions, the other half of said third light beam is detected by the second and fourth detecting regions, and resulting detection signals are processed by comparing an output detected by the first and third detecting regions with an output detected by the second and fourth detecting regions, so that a control signal for adjusting at least the position of the converging means relative to the information recording medium, in the direction of a plane extending perpendicular to the optical axis, and is supplied to the second response means.

18. An optical system for adjusting the focus of a light beam, comprising:

means, having a major optical axis, for focusing the light beam toward a reflective object;

means for splitting a light beam reflected from the object into first, second, and third split beams, the first split beam having a first optical axis parallel to the major optical axis, the second split beam having a second optical axis parallel to the major optical axis, and the third split beam extending along the major optical axis, wherein the splitting means includes first and second optical elements spaced from each other by a predetermined gap and tilted in opposite directions, the major optical axis extending through the gap, each of the first and second optical elements including non-reflective means for directing the first split beam along the first optical axis toward a first focus position, directing the second split beam along the second optical axis toward a second focus position, and directing the third split beam along the major optical axis toward a third focus position;

means for detecting the first split beam at the first focus position, said first split beam detecting means having at least two photosensitive regions that generate first electrical signals corresponding to said first split beam;

means for detecting the second split beam at the second focus position, said second split beam detecting means having at least two photosensitive regions that generate second electrical signals corresponding to said second split beam;

means for detecting the third split beam at the third focus position, said third split beam detecting means having at least two photosensitive regions that generate third electrical signals corresponding to said third split beam; and means, responsive to the first, second, and third electrical signals, for adjusting the location of the focusing means with respect to the object.

* * * * *